(No Model.)

P. SCHULZ & A. KUNDE.
PULLEY.

No. 532,827. Patented Jan. 22, 1895.

Witnesses.
O. N. Kency.
Anna V. Faust.

Inventors.
Peter Schulz
Albert Kunde
By Benedict Morsell
Attorneys.

UNITED STATES PATENT OFFICE.

PETER SCHULZ AND ALBERT KUNDE, OF RACINE, WISCONSIN.

PULLEY.

SPECIFICATION forming part of Letters Patent No. 532,827, dated January 22, 1895.

Application filed June 4, 1894. Serial No. 513,360. (No model.)

*To all whom it may concern:*

Be it known that we, PETER SCHULZ and ALBERT KUNDE, of Racine, in the county of Racine and State of Wisconsin, have invented a new and useful Improvement in Pulleys, of which the following is a description, reference being had to the accompanying drawings, which are a part of this specification.

The object of our invention is to provide means for securing a band wheel, pulley or analogous device firmly on its shaft, and for automatically tightening it thereon; and the invention embodies means for accomplishing these objects, and incidentally thereto, the construction of the pulley which adapts it for being readily placed on and secured to the shaft firmly, or removed therefrom, without having to take the shaft from its journal bearings.

Figure 1:
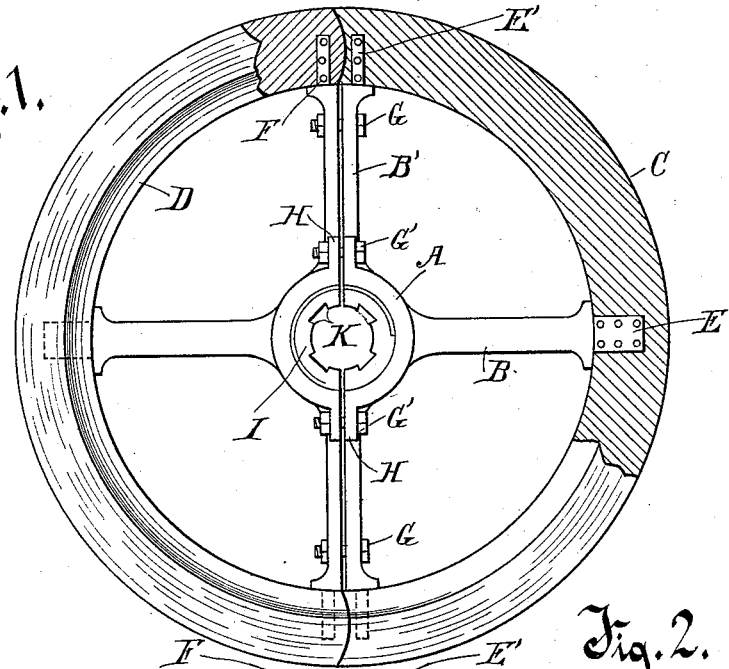
Figure 2:
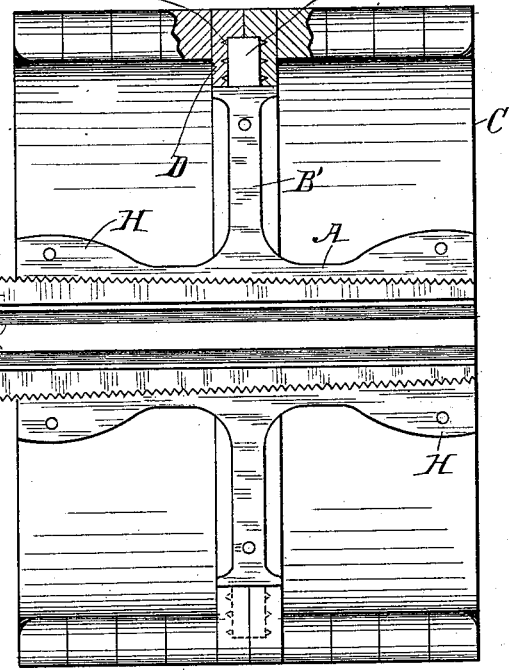
Figure 3:
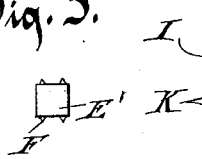
Figure 4:
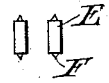

In the drawings, Figure 1, is an end elevation of a band wheel or pulley embodying our invention, parts being broken away to exhibit interior construction. Fig. 2, is an elevation of the straight or flat side of one of the two parts into which our pulley is divided, portions being broken away to exhibit interior construction. Figs. 3 and 4 are plans of details of the structure.

In our improved pulley the hub A and the spokes B B' are preferably of metal, and the rim C having a central annular inwardly projecting rib D is advisably of wood. The spokes B B' terminate in tenons E E' which are provided with laterally projecting spurs F, the tenons being fitted into mortised recesses therefor in the rib D, and the spurs being pressed into the wood in the making of the pulley.

The pulley is made in two longitudinal parts or halves whereby the pulley can be readily placed on or removed from its shaft, the two parts being held to each other by bolts G G' respectively, through the spokes B' and flanges or wings H opposite each other on the two parts of the hub. The hub A is hollow or bored longitudinally, and is screw threaded on its interior surface about the bore.

For securing the pulley firmly on the shaft, and for tightening it thereon, we provide a key in the form of a sleeve I, divided longitudinally into two parts or halves substantially surrounding the shaft. This sleeve-key is slightly tapering in form, and is screw-threaded exteriorly. The sleeve-key is of such size as to fit snugly on the shaft, and is preferably provided with longitudinal channels, the sharp edges K of the walls of the channels, being adapted to engage the exterior of the shaft and prevent the rotation of the sleeve-key thereon. The sleeve-key I is advisably somewhat longer than the hub of the pulley.

To place our improved pulley on its shaft, when said shaft is in its journal bearings, the two parts of the pulley are placed on the shaft, and secured together by the bolts G G', the two parts of the sleeve-key I are placed on the shaft at the point at which the pulley is to be located, and the pulley is then turned on to the sleeve-key by its screw thread from its smaller extremity, the pulley being brought to its seat and made firm on the shaft by turning on the screw thread on the tapering sleeve-key.

The pulley and the sleeve-key are placed on the shaft, with the larger end of the sleeve-key toward the right or toward the left, as desired, so that the pull of the belt on the pulley, will tend to turn the pulley up on the sleeve-key and thereby tighten it, and thus lock it more firmly in place.

What we claim as our invention, and desire to secure by Letters Patent, is—

The combination of a pulley, comprising a rim, spokes secured rigidly to the rim, and a hub integral with the spokes, the hub, the rim, and two oppositely radiating spokes being formed in two substantially equal parts divided longitudinally, the parts abutting each other and being secured releasably to each other, said hub having a tapered screw-threaded bore axially, and a screw-threaded tapering sleeve-key in two longitudinal non-attached parts adapted to be inserted in the hub of the pulley about the shaft, on which sleeve-key the pulley turns to bring it to its seat on the shaft or to release it therefrom, said sleeve-key being also provided with longitudinal channels in its inner surface, the sharp edges of which channals are adapted to engage the shaft and prevent the rotation of the sleeve thereon, substantially as described.

In testimony whereof we affix our signatures in presence of two witnesses.

PETER SCHULZ.
ALBERT KUNDE.

Witnesses:
PETER BERING NELSON,
S. DAVIES.